United States Patent
Song et al.

(10) Patent No.: US 11,537,304 B2
(45) Date of Patent: Dec. 27, 2022

(54) DATA VERIFICATION METHOD AND APPARATUS, AND STORAGE MEDIUM

(71) Applicant: Alibaba Group Holding Limited, Grand Cayman (KY)

(72) Inventors: Pingfan Song, Beijing (CN); Yuesheng Gu, Beijing (CN)

(73) Assignee: Alibaba Group Holding Limited

( * ) Notice: Subject to any disclaimer, the term of this patent is extended or adjusted under 35 U.S.C. 154(b) by 0 days.

(21) Appl. No.: 17/133,426

(22) Filed: Dec. 23, 2020

(65) Prior Publication Data
US 2021/0117093 A1 Apr. 22, 2021

Related U.S. Application Data

(63) Continuation of application No. PCT/CN2019/091227, filed on Jun. 14, 2019.

(30) Foreign Application Priority Data

Jun. 28, 2018 (CN) .......................... 201810687959.5

(51) Int. Cl.
*G06F 3/06* (2006.01)
*G06F 21/64* (2013.01)

(52) U.S. Cl.
CPC ............ *G06F 3/064* (2013.01); *G06F 3/0604* (2013.01); *G06F 3/067* (2013.01); *G06F 21/64* (2013.01)

(58) Field of Classification Search
None
See application file for complete search history.

(56) References Cited

U.S. PATENT DOCUMENTS

| | | |
|---|---|---|
| 7,200,626 B1 | 4/2007 | Hoang |
| 8,386,835 B2 | 2/2013 | Dilger et al. |
| 8,468,423 B2 | 6/2013 | Zvibel |
| 8,555,142 B2 | 10/2013 | Grube et al. |
| 8,694,467 B2 | 4/2014 | Sun |
| 8,910,031 B1 | 12/2014 | Liu et al. |

(Continued)

FOREIGN PATENT DOCUMENTS

| | | |
|---|---|---|
| CN | 103731505 A | 4/2014 |
| CN | 103984607 A | 8/2014 |

(Continued)

OTHER PUBLICATIONS

Translation of International Search Report dated Sep. 19, 2019, from corresponding CN PCT Application No. PCT/CN2019/091227, 2 pages.

(Continued)

*Primary Examiner* — Brian R Peugh
(74) *Attorney, Agent, or Firm* — Lee & Hayes, P.C.

(57) ABSTRACT

A method including determining a to-be-verified data block among a plurality of data blocks corresponding to a predetermined file in a distributed storage system, wherein a storage node where the to-be-verified data block is located comprises a storage node that meets a load balancing strategy in the distributed storage system; and verifying the to-be-verified data block. The present disclosure solves the technical problem in the conventional technologies in which the read/write performance at a user front end is affected during a data verification process.

20 Claims, 5 Drawing Sheets

(56) References Cited

U.S. PATENT DOCUMENTS

| | | | |
|---|---|---|---|
| 9,015,499 B2 | 4/2015 | Grube et al. | |
| 9,152,512 B2 | 10/2015 | Cronin et al. | |
| 9,448,877 B2 | 9/2016 | Candelaria | |
| 9,507,786 B2 * | 11/2016 | Dhuse | G06F 16/148 |
| 9,880,904 B2 * | 1/2018 | Yallamraju | G06F 11/1451 |
| 9,940,059 B2 | 4/2018 | Agrawal et al. | |
| 10,025,665 B2 * | 7/2018 | Resch | G06F 3/067 |
| 10,318,380 B2 * | 6/2019 | Resch | H04L 67/1095 |
| 2009/0030983 A1 | 1/2009 | Malaiyandi | |
| 2012/0117351 A1 | 5/2012 | Motwani | |
| 2017/0077950 A1 * | 3/2017 | Pavlov | H03M 13/611 |
| 2018/0039538 A1 | 2/2018 | Freikorn et al. | |

FOREIGN PATENT DOCUMENTS

| | | |
|---|---|---|
| CN | 104239148 A | 12/2014 |
| CN | 105530294 A | 4/2016 |

OTHER PUBLICATIONS

Translation of Written Opinion dated Sep. 19, 2019, from corresponding CN PCT Application No. PCT/CN2019/091227, 3 pages.

\* cited by examiner

```
┌─────────────────────────────────────────────────────────────┐
│  DETERMINE TO-BE-VERIFIED DATA BLOCK AMONG PLURALITY OF DATA│
│   BLOCKS CORRESPONDING TO PREDETERMINED FILE IN DISTRIBUTED │
│  STORAGE SYSTEM, WHEREIN STORAGE NODE WHERE TO-BE-VERIFIED  │
│   DATA BLOCK IS LOCATED COMPRISES STORAGE NODE THAT MEETS   │
│      LOAD BALANCING STRATEGY IN DISTRIBUTED STORAGE SYSTEM  │
│                            S202                             │
└─────────────────────────────────────────────────────────────┘
                              │
                              ▼
┌─────────────────────────────────────────────────────────────┐
│                VERIFY TO-BE-VERIFIED DATA BLOCK             │
│                            S204                             │
└─────────────────────────────────────────────────────────────┘
```

FIG. 2

DATA VERIFICATION METHOD AND APPARATUS, AND STORAGE MEDIUM

CROSS REFERENCE TO RELATED APPLICATIONS

This application claims priority to and is a continuation of PCT Patent Application No. PCT/CN2019/091227, filed on 14 Jun. 2019 and entitled "DATA VERIFICATION METHOD AND APPARATUS, AND STORAGE MEDIUM," which claims priority to Chinese Patent Application No. 201810687959.5, filed on 28 Jun. 2018 and entitled "DATA VERIFICATION METHOD AND APPARATUS, AND STORAGE MEDIUM," which are incorporated herein by reference in their entirety.

TECHNICAL FIELD

The present disclosure relates to the field of computers, and, more particularly, to data verification methods and apparatuses, and computer storage media.

BACKGROUND

In a large distributed storage system, the probability of data corruption on a single node is greatly increased due to the long input-output (IO) link and the large number of nodes. Therefore, verifying the consistency of data blocks stored in the system and checking whether a plurality of replicas of a data block are consistent becomes significantly necessary. However, data verification itself needs to occupy additional bandwidth resources of the network and storage nodes in the distributed storage system. Users of distributed storage systems often have high demands for low latency and high throughput. As a result, a data verification solution which can quickly complete data consistency verification and at the same time minimizes the impact on the read/write operations at a user front end is desired.

There are mainly the following two data verification solutions in the conventional technologies. Solution I: a verification program transmits to the storage nodes where all replicas are located a verification request for a specified data block; the storage nodes read the data of the entire replica, use a verification algorithm such as CRC32/MD5 to calculate check codes of the entire replica data, and return them to the verification program; the verification program then compares the check codes returned by all the storage nodes and see if they are the same; and if they are different, the data of the plurality of replicas are inconsistent. Solution II: a verification program performs secondary slicing on data blocks; the verification program selects an unchecked slice, and transmits to the storage nodes where all replicas are located a verification request for the specified slice of the specified data block; the storage nodes read the data of the specified slice of the replicas, use a verification algorithm such as CRC32/MD5 to calculate check codes of the slice data, and return them to the verification program; the verification program compares the check codes returned by all the storage node and see if they are the same; and if they are different, the slice joins the retry queue and undergoes more retries. If the check codes returned by all the storage node are still different after the maximum number of retries is exceeded, the data of the plurality of replicas are inconsistent.

Solution I mentioned above is mainly used for verification of read-only data. If a user updates data continuously, due to the data transmission delay on the network, some of the storage nodes where multiple replicas of a data block are located may have received a write request while some may not have received the write request. Therefore, it is common that an inconsistency is found within a short period of time. At this time, data verification will result in inconsistent results, which may lead to inaccurate conclusions, thus causing false positives. In addition, the solution reads the data of the entire replica for each verification request, which occupies a large number of disk bandwidth resources of the storage nodes, which in turn causes a huge glitch on the performance of the user's normal read requests.

Solution II mentioned above employs secondary slicing and retry, which reduces read glitches caused by the verification request to the user and decrease false positives caused by the dynamic data change. Nevertheless, the data verification still occupies a certain disk and network bandwidth of the storage nodes under verification. Therefore, the performance deterioration problem still exists since the user's read/write requests need to access the storage nodes under verification.

Therefore, in the conventional technologies, the read/write operations at a user front end are affected during a data verification process, resulting in performance deterioration.

With regard to the aforementioned problem, no effective solution has been proposed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Embodiments of the present disclosure provide a data verification method and apparatus, and a storage medium, so as to at least solve the technical problem in the conventional technologies in which the read/write performance of a user front end is affected during a data verification process.

According to an embodiment of the present disclosure, a data verification method is provided, comprising: determining a to-be-verified data block among a plurality of data blocks corresponding to a predetermined file in a distributed storage system, wherein a storage node where the to-be-verified data block is located comprises: a storage node that meets a load balancing strategy in the distributed storage system; and verifying the to-be-verified data block.

According to an embodiment of the present disclosure, a data verification apparatus is further provided, comprising: a determination module configured to determine a to-be-verified data block among a plurality of data blocks corresponding to a predetermined file in a distributed storage system, wherein a storage node where the to-be-verified data block is located comprises: a storage node that meets a load balancing strategy in the distributed storage system; and a verification module configured to verify the to-be-verified data block.

According to an embodiment of the present disclosure, a storage medium is further provided, which stores a program instruction, wherein the program instruction, when running, controls a device where the storage medium is located to execute the data verification method according to any one of the foregoing.

According to an embodiment of the present disclosure, a processor is further provided, which is configured to run a program, wherein the program, when running, executes the data verification method according to any one of the foregoing.

In the embodiments of the present disclosure, using a storage node having a to-be-verified data block comprises: a manner of a storage node that meets a load balancing strategy in a distributed storage system; and a storage node where the determined to-be-verified data block is located comprises: a storage node that meets a load balancing strategy in a distributed storage system, which, during verification of the to-be-verified data block, prevents a large number of verification requests from being centralized on several storage nodes that causes the problem of excessive load on some storage nodes, effectively reducing contention among different verification tasks, greatly improving the overall verification speed of the cluster in the distributed storage system, achieving the purpose of decreasing occupation of disk and network resources of storage nodes, and reducing the impact on the read/write operations at a user front end during the data verification process, thereby achieving the technical effect of improved read/write performance, and solving the technical problem in the conventional technologies in which the read/write performance of a user front end is affected during a data verification process.

BRIEF DESCRIPTION OF DRAWINGS

The drawings described herein are intended to facilitate further understanding of the present disclosure, and constitute a part of the present application. The illustrative embodiments of the present disclosure and the descriptions thereof are used to explain the present disclosure, and are not intended to constitute an improper limitation on the present disclosure. In the drawings:

FIG. 2 shows a flowchart of a data verification method provided according to an example embodiment of the present application;

DESCRIPTION OF EMBODIMENTS

Figure 1:
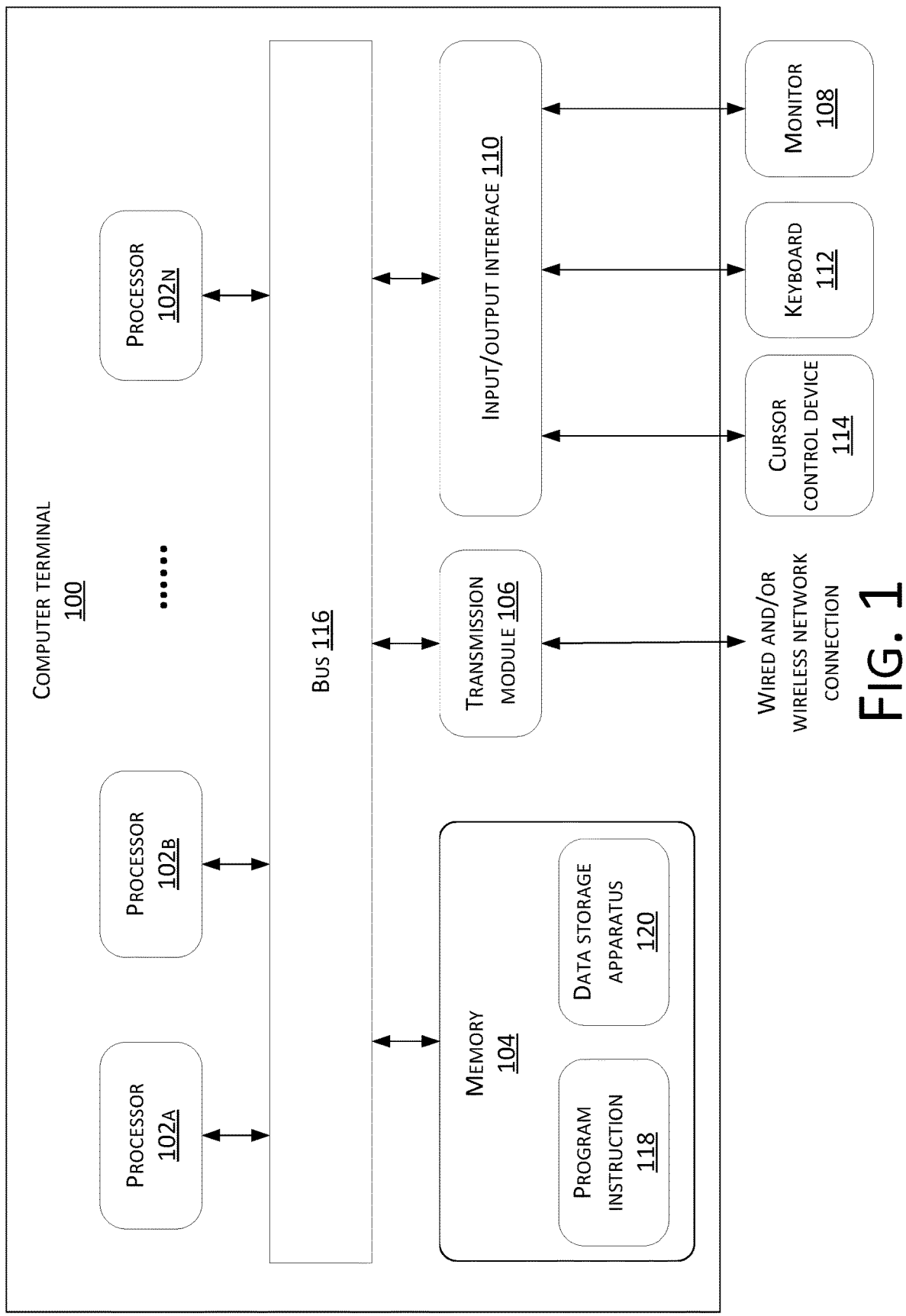
FIG. 1 shows a block diagram of a hardware structure of a computer terminal (or mobile device) configured to implement a data verification method.

In order to enable those skilled in the art to better understand the technical solution of the present disclosure, the technical solution in the embodiments of the present disclosure is clearly and completely described below with reference to the accompanying drawings in the embodiments of the present disclosure. Obviously, the described embodiments are merely some but not all of the embodiments of the present disclosure. All other embodiments obtainable by those skilled in the art based on the embodiments of the present disclosure without creative efforts should fall within the protection scope of the present disclosure.

It should be noted that the terms including "first" and "second" in the specification, claims, and aforementioned drawings of the present disclosure are used to distinguish similar objects, and are not necessarily used to describe a specific order or sequence. It should be understood that the data used in this way can be interchanged under appropriate circumstances so that the embodiments of the present disclosure described herein can be implemented in an order other than those illustrated or described herein. In addition, the terms "comprise" and "have" and any variations thereof are intended to cover non-exclusive inclusions. For example, a process, method, system, product, or device that comprises a series of steps or units is not necessarily limited to those clearly listed steps or units but may comprise other steps or units that are not clearly listed or are inherent to such process, method, product, or device.

First of all, some of the nouns or terms that appear in the description of the embodiments of the present application are explained as follows.

Distributed storage system: a system composed of several nodes, which provide storage services externally as a whole. It usually uses a distributed algorithm to provide high availability and high performance, and can tolerate the failures of some nodes; for example, it can comprise master control nodes and storage nodes.

Master control node: a node that manages metadata in a distributed storage system, also referred to as "master node".

Storage node: a node that stores application data in a distributed storage system, generally composed of several storage media.

Data block: in a distributed storage system, for the sake of data distribution balance, a file is split into several blocks according to a fixed size. Each block is referred to as a data block, which corresponds to a piece of continuous data of the original file.

Replica: in a distributed storage system, for the sake of data security, a data block is replicated and more copies are made and stored on different storage nodes with each copy being referred to as a replica.

Due to the large number of nodes and files and a great amount of data in a distributed storage system, in order to efficiently and quickly verify all files in the system, the verification process provided by the present application is as follows: obtain a list of files in the distributed storage system, then create a verification task for each file and add it into a thread pool, and finally process all verification tasks concurrently at a high concurrency level N.

In the conventional technologies, data verification solutions will affect read/write performance of a user front end during a data verification process. With regard to this problem, the embodiments of the present application provide a corresponding solution, which is described in detail below.

According to the embodiments of the present disclosure, a method embodiment of data verification is further provided. It should be noted that the steps shown in the flowchart in the accompanying drawing can be executed in a computer system, such as a set of computer-executable instructions. Although the logical sequence is shown in the flowchart, in some cases, the steps shown or described herein may be executed in a different order.

During a data verification process, a storage node reads data blocks and calculates check codes according to a verification request. However, there will be more storage nodes in a distributed storage system, and data verification will occupy a certain amount of disk and network bandwidth of the storage node under verification. In the present application, storage nodes are load-balanced to prevent more verification tasks running concurrently from being intensively centralized on several storage nodes which in turn leads to excessive load on some storage nodes. The present application effectively reduces contention among different verification tasks, and greatly improves the overall verification speed of the cluster in the distributed storage system. In addition, when a plurality of verification tasks transmit verification requests, a global traffic control manner is used to ensure that the number of verification requests on each storage node per unit time can be controlled within a certain range, so as to ensure that the additional resource overhead caused by data verification on each storage node per unit time can be controlled within an acceptable range. In other words, for a single storage node, the global traffic control manner can limit the total number of verification requests transmitted by all verification tasks within an acceptable range, effectively avoiding the problem of having excessive load on a single storage node. It should be noted that if there is no load-balanced processing manner, most verification tasks may access the same storage node at the same time; and if a global traffic control manner is then used for a single storage node, all verification tasks will be slowed down and the overall verification speed of the cluster will be slowed down. With the load-balanced processing manner, since the situation where the plurality of verification tasks are intensively centralized on a storage node for verification does not occur, contention among different verification tasks is reduced, and the overall verification speed of the cluster is effectively improved.

Furthermore, the present application implements retries in a back-off manner to avoid the situation where too many verification requests affect the normal read/write of an interval. Through one or more of the aforementioned various manners, the present application decreases occupation of disk and network resources of storage nodes by a high-concurrency data verification process, thereby effectively reducing the impact of the data verification process on the read/write operations at a user front end while maintaining a rapid completion of verification tasks at the same time. As such, the data verification can run normally without the user's knowledge.

Based on the foregoing ideas, the method embodiment provided in the present application can be executed in a mobile terminal, a computer terminal, or a similar computing apparatus. FIG. 1 shows a block diagram of a hardware structure of a computer terminal (or mobile device) configured to implement a data verification method. As shown in FIG. 1, the computer terminal 100 (such as a mobile device) may comprise one or more (shown in the figure as 102a, 102b, . . . , 102n, wherein n may be any integer) processors 102 (the processor 102 may comprise, but is not limited to, a processing apparatus such as a microprocessor like MCUs or a programmable logic device like FPGAs), a memory 104 for storing data, and a transmission module 106 for wired and/or wireless network connection. In addition, the computer terminal 100 may also comprise: a display such as a monitor 108, an input/output interface (I/O interface) 110, a universal serial bus (USB) port (which can be included as one of the ports of the I/O interface), a keyboard 112, a cursor control device 114, a network interface, a power supply, and/or a camera. These components of the computer terminal 100 are connected via a bus 116.

Those skilled in the art can understand that the structure shown in FIG. 1 is only for illustration, and does not limit the structure of the aforementioned electronic apparatus. For example, the computer terminal 100 may also comprise more or fewer components than those shown in FIG. 1, or have a different configuration from that shown in FIG. 1.

It should be noted that the aforementioned one or more processors 102 and/or other data processing circuits can be generally referred to as a "data processing circuit" herein. The data processing circuit can be embodied in whole or in part as software, hardware, firmware, or any other combination. In addition, the data processing circuit can be a single independent processing module, or fully or partially integrated into any one of the other elements in the computer terminal 100 (or mobile device). As is involved in the embodiment of the present application, the data processing circuit is controlled as a type of processor (for example, a selection of a variable resistance terminal path connected to an interface).

The memory 104 can be used to store software programs and modules of application software, such as program instructions 118 or data storage apparatus 120, corresponding to the data verification method in the embodiment of the present disclosure. The processor 102 runs the software programs and modules stored in the memory 104 to execute various function applications and data processing, i.e., achieving the data verification method of the aforementioned application program. The memory 104 may comprise a high-speed random access memory, and may also comprise a non-volatile memory, such as one or more magnetic storage apparatuses, flash memories, or other non-volatile solid-state memories. In some examples, the memory 104 may further comprise, with respect to the processor 102, memories remotely disposed. These remote memories may be connected to the computer terminal 100 via a network. Examples of the aforementioned network include, but are not limited to, the Internet, corporate intranets, local area networks, mobile communication networks, and combinations thereof.

The transmission module 106 is used to receive or transmit data via a network. Examples of the aforementioned network may comprise a wireless network provided by a communication provider of the computer terminal 100. In one example, the transmission module 106 comprises a network adapter (Network Interface Controller, NIC), which can be connected to other network devices through a base station, such that the communication with the Internet becomes plausible. In one example, the transmission module 106 may be a radio frequency (RF) module, which is used to communicate with the Internet in a wireless manner.

The display may be, for example, a touch screen liquid crystal display (LCD), which can enable a user to interact with a user interface of the computer terminal 100 (or mobile device).

In the aforementioned operating environment, the present application provides a data verification method as shown in FIG. 2. FIG. 2 shows a flowchart of a data verification method provided according to the present application; as shown in FIG. 2, the method comprises:

Step S202: determining a to-be-verified data block among a plurality of data blocks corresponding to a predetermined file in a distributed storage system, wherein a storage node where the to-be-verified data block is located comprises: a storage node that meets a load balancing strategy in the distributed storage system.

It should be noted that the aforementioned load balancing strategy can be used to balance verification tasks on storage nodes storing data blocks in a distributed storage system. For example, if there are many verification tasks on a certain storage node (the number of verification tasks reaches a threshold) or the verification tasks are complex (the complexity of the verification tasks is greater than a threshold), the storage node can be considered as over-loaded. When a data block needs to be verified, if it is found that it should correspond to the storage node, the data block is not verified at this time. However, when there are only a few verification tasks on the storage node corresponding to the data block or the verification tasks are simple, the data block can be verified. In this way, the verification tasks on the storage nodes in the distributed storage system can be balanced, such that some storage nodes would not have excessive load.

It should be noted that the storage node that meets a load balancing strategy in the aforementioned distributed storage system can be considered, among a plurality of storage nodes in the distributed storage system, as a storage node with fewer (the number of verification tasks is less than a threshold) or simpler (the complexity of verification tasks is less than a threshold) verification tasks, but it is not so limited.

For the sake of data security, a data block can be replicated and a plurality of replicas can be made. Each replica is respectively stored on a different storage node, i.e., each replica corresponding to a storage node. Therefore, in an example embodiment of the present application, the aforementioned step S202 can be embodied as follows: select a first data block from a plurality of data blocks as a to-be-verified data block, wherein the first data block is a data block stored in storage nodes, where the replicas are located, among which a number of first storage nodes reaches a predetermined number, and the first storage nodes are storage nodes on which the number of verification tasks has not reached an upper limit of verification tasks. That is, among the storage nodes where the replicas of the determined to-be-verified data block are located, the number of storage nodes with fewer verification tasks reaches the predetermined number.

It should be noted that the aforementioned predetermined number may be preset according to needs. In an example embodiment of the present disclosure, the aforementioned predetermined number may be the number of all replicas of a data block. That is, it can be considered that there are fewer verification tasks on the storage nodes where all replicas of the aforementioned to-be-verified data block are located.

In an example embodiment of the present application, a first data block may be selected from a plurality of data blocks as the to-be-verified data block according to a first mapping table, wherein the first mapping table stores a corresponding relationship between the address of a storage node and the number of concurrent verification tasks that access the storage node.

It should be noted that a data block can be stored in a first-in-first-out queue in advance. For example, take M as the upper limit of verification tasks (the maximum number of verification tasks) on a storage node, and table A as a first mapping table, wherein a "key" value in the table A represents the address of a storage node, and a "value" value corresponding to the "key" value represents the number of concurrent verification tasks that access the storage node. The aforementioned step S202 can be embodied as follows: extract a data block from a first-in-first-out queue, and address information of replicas of the extracted data block is used; for the address information of each replica, search for the address information of the corresponding replica in the "key" value column or row in the table A; and if the address information exists, determine whether the number of verification tasks on the storage node corresponding to the address information of the replica reaches the aforementioned M; when the number of verification tasks on storage nodes where all replicas of the aforementioned data block are located does not reach M, increase the "value" value corresponding to the corresponding storage node in the table A by 1; and the data block at this time is the to-be-verified data block; when the number of verification tasks on at least one storage node among storage nodes where all replicas of the data block are located reaches M, insert the data block into the end of the aforementioned first-in-first-out queue, and extract a data block again to continue the aforementioned search and determination process until the extracted data block is a data block that meets a load balancing strategy (the number of verification tasks on storage nodes where all replicas of the data block are located does not reach M).

Step S204: verifying the to-be-verified data block.

In the solution disclosed in the aforementioned embodiment of the present application, after determining a to-be-verified data block among a plurality of data blocks included in a predetermined file in a distributed storage system, verify the to-be-verified data block. The storage node where the determined to-be-verified data block is located is a storage node that meets a load balancing strategy in the distributed storage system; and the solution can achieve the determination of the to-be-verified data block based on a load balancing strategy.

It is easy to notice that the storage node where the to-be-verified data block is located is a storage node that meets a load balancing strategy in the distributed storage system, i.e., the storage node being one on which the determined to-be-verified data block is located meets a load balancing strategy in the distributed storage system, which also means that the aforementioned determined to-be-verified data block is in fact determined based on a load balancing strategy. Therefore, through the aforementioned solution provided in the embodiment of the present application, during the process of verifying the to-be-verified data block, the problem that a large number of verification requests are centralized on several storage nodes which causes excessive load on some storage nodes can be avoided, effectively reducing contention among different verification tasks, greatly improving the overall verification speed of the cluster in the distributed storage system, achieving the purpose of decreasing occupation of disk and network resources of storage nodes, and reducing the impact on the read/write operations at a user front end during the data verification process, thereby achieving the technical effect of improved read/write performance, and solving the technical problem in the conventional technologies in which the read/write performance of a user front end is affected during a data verification process.

In order to reduce false positives caused by dynamic data changes and to reduce transmission traffic, in an example embodiment of the present disclosure, the aforementioned step S204 can be embodied as follows: perform secondary slicing on the to-be-verified data block to obtain data block slices; and verify the data block slices.

It should be noted that in order to ensure that the additional resource overhead caused by data verification on storage nodes can be controlled within an acceptable range, the present application provides an example embodiment. That is, verifying the data block slices can be embodied as follows: determine whether the number of verification requests on storage nodes where the data block slices are located has not reached the upper limit of verification requests; and if the determination result is that the number of verification requests on storage nodes where the data block slices are located has not reached the upper limit of verification requests, verify the data block slices. That is, by controlling the number of verification requests on storage nodes where the data block slices are located within a certain range, it can be ensured that the additional resource overhead caused by data verification on storage nodes can be controlled within an acceptable range, further achieving the purpose of decreasing occupation of disk and network resources of storage nodes, and reducing the impact on the read/write operations at a user front end during the data verification process, thereby achieving the technical effect of improved read/write performance, and better solving the technical problem in the conventional technologies in which the read/write performance of a user front end is affected during a data verification process.

It should be noted that the upper limit of verification requests may be the maximum number of verification requests allowed to be transmitted to storage nodes per unit time, but it is not so limited. The aforementioned upper limit of verification requests may be preset based on the characteristics of storage nodes, or may be set according to experience, but it is not so limited.

In order to better decrease occupation of disk and network resources of storage nodes, it can be further ensured that the number of verification requests on storage nodes per unit time can be controlled to be within a certain range, thereby ensuring that the number of verification requests on storage nodes per unit time can be controlled to be within an acceptable range. In an example embodiment of the present disclosure, the number of verification requests on storage nodes where the aforementioned data block slices are located is reset to zero within a predetermined period of time.

It should be noted that the "unit" in the aforementioned unit time can be any time, such as 1 s, 3 s, 5 s, 50 ms, etc., but it is not so limited. For example, the aforementioned predetermined period of time can be considered as unit time, which is not limited thereby.

In an example embodiment of the present disclosure, based on a second mapping table, it can be determined whether the number of verification requests on storage nodes where the data block slices are located has not reached the upper limit of verification requests, wherein the second mapping table stores a corresponding relationship between the address of a storage node and the number of verification requests that access the storage node.

It should be noted that the address of the storage node can be used as a "key" value in the second mapping table, and the number of verification requests that access the storage node can be used as a "value" value corresponding to the "key" value in the second mapping table, which is not limited thereby.

For example, take table B as the second mapping table, wherein a "key" value in the table B represents the address of an storage node; and a "value" value corresponding to the "key" value represents the number of verification requests that access the storage node; and N as the upper limit of verification requests (the maximum number of verification requests).

Before a verification request is transmitted to a storage node, use the address information of the storage node to search in the table B to see whether the number of verification requests which have been transmitted to the storage node in the period of time reaches N; if it does not reach N, transmit a verification request and increase the "value" value in the table B corresponding to the address of the storage node by 1; and if it has reached N, wait for a period of time and then search in the table B again until the traffic control conditions are met before transmitting a verification request.

It should be noted that after verification of the aforementioned data block slices, the situation where check codes are inconsistent may appear. At this time, there is a high probability that the user is modifying the interval corresponding to the data block slices, and the data is changing dynamically. Therefore, in the aforementioned embodiment of the present application, after verification of the aforementioned data block slices, the aforementioned method may further comprise performing a verification retry on the data block slices in a back-off retry manner, wherein the back-off retry manner is to perform a delayed retry on the data block slices.

In an example embodiment of the present application, performing a verification retry on the data block slices in a back-off retry manner can be embodied as follows: during the process of verification retry, the time interval of a current retry is determined by the time interval of the preceding retry immediately before the current retry, wherein the time interval of the current retry is greater than the time interval of the preceding retry.

By verification retry on the data block slices in the aforementioned back-off retry manner, the present application avoids having too many retry requests that would affect the normal read/write of the interval corresponding to the aforementioned data block slices, and the time of continuously observing the aforementioned data block slices is also increased, further achieving the purpose of decreasing occupation of disk and network resources of storage nodes, and reducing the impact on the read/write operations at a user front end during the data verification process, thereby achieving the technical effect of improved read/write performance, and better solving the technical problem in the conventional technologies in which the read/write performance of a user front end is affected during a data verification process.

It should be noted that the step of the time interval of the current retry being determined by the time interval of the preceding retry immediately before the current retry can be embodied as follows: a predetermined value is obtained from the time interval of the preceding retry through recursive function processing, and the smaller one of the predetermined value and the upper limit of retry interval is the time interval of the current retry.

Figure 3:
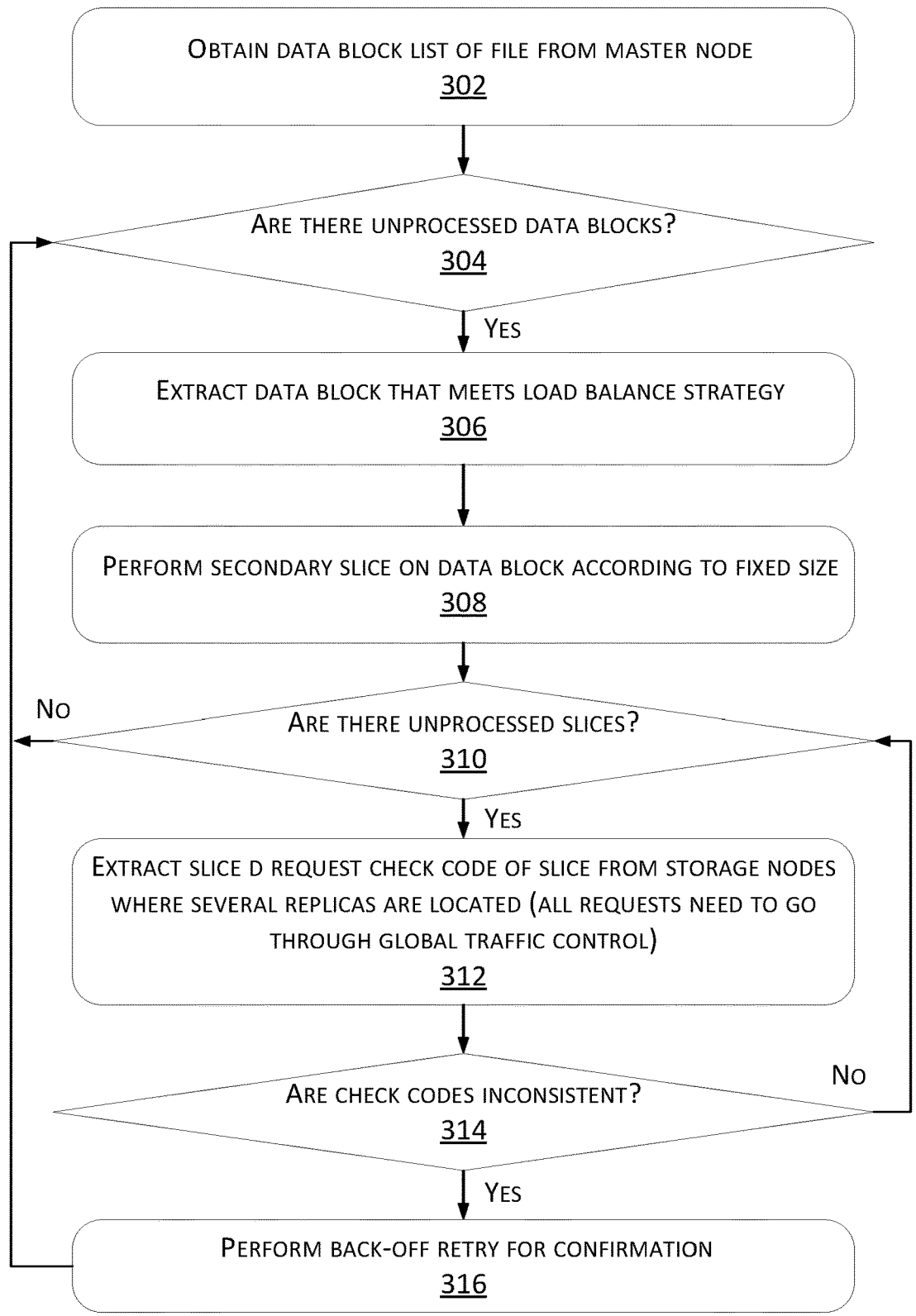
FIG. 3 shows a schematic diagram of a processing flow of a single file provided according to an example embodiment of the present application.

It should be noted that due to the large number of nodes and files and a great amount of data in a distributed storage system, in order to efficiently and quickly verify all files in the system, after obtaining a list of files in the distributed storage system, the solution creates a verification task for each file and add it into a thread pool, and finally processes all verification tasks concurrently at a high concurrency level. Here, FIG. 3 shows a schematic diagram of a processing flow of a single file provided according to an example embodiment of the present application. As shown in FIG. 3, the processing flow of a single file comprises:

Step 302: obtaining a data block list of the file from a master node;

Step 304: determining whether there are unprocessed data blocks in the data block list; wherein if the determination result is yes, proceed to step 306; and if the determination result is negative, the process comes to an end;

Step 306: extracting a data block that meets a load balancing strategy;

Step 308: performing secondary slicing on the data block according to a fixed size;

Step 310: determining whether there are unprocessed slices; wherein if the determination result is yes, proceed to step 312; and if the determination result is negative, proceed to step 302;

Step 312: extracting a slice and requesting a check code of the slice from storage nodes where several replicas are located (all requests need to go through a global traffic control);

Step 314: determining whether the check codes are inconsistent; if so, proceed to step 316; if not, proceed to step 310; and Step 316: performing a back-off retry for confirmation.

In each single verification task, first all data blocks of the file and address information of all replicas of these data blocks are obtained through the master node, and then these data blocks are inserted into a first-in first-out queue. For the queue, a suitable data block is selected from the queue each time according to a principle of load balancing of storage nodes, secondary slicing is performed on the data block, and then all slices are verified in turn for consistency. During the verification process, a global traffic control is imposed on verification requests. When all slices of the data block are verified, select a next data block to proceed until all data blocks are verified. Then, the single verification task ends.

During the verification process of a single slice, first a verification request is transmitted to storage nodes where replicas are located. The verification request comprises the data block name, the offset of the slice in the data block, and the length of the slice. The storage nodes read data of the specified slice of the replicas according to the verification request, calculate check codes, and then return the check codes of the slice. The check codes of the slice of different replicas are compared; if they are different, a back-off retry is performed for confirmation. A warning message is generated for the slice that is finally confirmed to have inconsistent check nodes.

That is, in the aforementioned embodiment of the present application, the impact on front-end read/write is reduced mainly by combining strategies such as load balancing of storage nodes, global traffic control of verification requests, and back-off retry. Details are described below respectively:

(1) Load Balancing of Storage Nodes

In order to prevent more verification tasks running concurrently from centralizing a large number of verification requests on several storage nodes which causes excessive load on some storage nodes, the storage nodes are load-balanced in this example solution: set the maximum number of verification tasks M (equivalent to the aforementioned upper limit of verification tasks), which are allowed to simultaneously access the same storage node, and create a global mapping table A (equivalent to the aforementioned first mapping table), wherein a "key" in the table A represents the address of a storage node, and a corresponding "value" represents the number of concurrent verification tasks that will access the storage node. This effectively reduces contention among different verification tasks and greatly improves the overall verification speed of the cluster in the distributed storage system.

In a single verification task, each time after a data block is extracted from a first-in-first-out queue, it is required to search in the table A using address information of several replicas of the data block to see whether the number of verification tasks which may concurrently access the storage node where a certain replica is located has reached M. If the number of verification tasks on storage nodes where all replicas of the data block are located has not reached M, the "value" value corresponding to the storage node in the table A is increased by one, and the data block is processed; otherwise, the data block is inserted into the end of the queue, another data block is extracted to continue the aforementioned load balancing check until a data block that meets the load balancing strategy is extracted.

(2) Global Traffic Control of Verification Requests

In this example solution, more verification tasks of the verification program will pass a global traffic control when transmitting verification requests. For a single storage node, the global traffic control manner can limit the number of verification requests transmitted by all verification tasks in an acceptable range, effectively avoiding the problem of excessive load on a single storage node. The global traffic control is used to ensure that the number of verification requests transmitted by the verification program to each storage node per unit time can be controlled within a certain range, thereby ensuring that the additional resource overhead caused by data verification to each storage node can be controlled within an acceptable range: set the maximum number of verification requests allowed to be transmitted to a single storage node per unit time as N (equivalent to the aforementioned upper limit of verification requests); and create a global mapping table B (equivalent to the aforementioned second mapping table), wherein a "key" in the table represents the address of a storage node, and a corresponding "value" represents the number of verification requests that have been transmitted by all verification tasks to the storage node within a certain time range. At a short time interval (for example, 1 s/1 min) (equivalent to the aforementioned predetermined period of time), statistical results corresponding to all storage nodes in the table B will be reset to zero, and then statistics will be re-performed. The time interval is referred to as a time slice.

In a single verification task, before the verification program transmits a verification request to a storage node, address information of the storage node needs to be used to perform a search in the table B to see whether the number of verification requests which have been transmitted to the storage node in the current time slice reaches the upper limit N. If it has not reached N, the verification request is transmitted; and the number of transmitted requests corresponding to the storage node in the table B is increased by one; otherwise, the verification task would need to wait for some time and then perform a search in the table B again until the traffic control conditions are met before actually transmitting the request.

(3) Back-Off Retry

If a slice with inconsistent check codes is found, there is a high probability that the user is modifying the interval corresponding to the slice, and the data is dynamically changing. In this case, this preferred solution will perform retries. Nevertheless, in order to avoid too many retry requests affecting the normal read/write of the interval and to have a longer time window to continuously observe the slice, this preferred solution performs retries in a back-off manner: set the maximum number of retries as Z, the initial value of the retry interval as T0, the upper limit as Tm, and the recursive function as $F(x)$; set the interval of the nth retry as $T_n$, and let $T_n = F(T_{n-1})$, and $T_n >= T_{n-1}$.

During the retry process, let the first retry interval be $T_1 = T_0$; thereafter, for each retry interval $T_n$, a temporary value $T_x$ is calculated from the preceding retry interval $T_{n-1}$ (equivalent to the time interval of the preceding retry) as per the recursive function $F(x)$, and the smaller one of $T_x$ and $T_m$ is used as the actual interval of this current retry (equivalent to the time interval of this current retry) until it is found after a retry that the slice passes the consistency verification, or the number of retries reaches Z; and then the retry ends.

It should be noted that the aforementioned M, N, and Z are all integers greater than zero, but they are not so limited.

It should be noted that the execution body of the aforementioned method can be the terminal shown in FIG. 1 above, or it can be a program such as a verification program. The verification program can be located on the terminal or on a third-party device different from the terminal, which is not limited thereby.

It should be noted that for the aforementioned method embodiments, for the sake of simple description, they are all expressed as a series of action combinations. However, those skilled in the art should know that the present disclosure is not limited by the described sequence of actions as some steps can be performed in another order or simultaneously according to the present disclosure. Secondly, those skilled in the art should also know that the embodiments described in the specification are all preferred embodiments, and the involved actions and modules are not necessarily required by the present disclosure.

Those skilled in the art can clearly understand from the description of the above implementation manners that the method according to the above embodiments can be implemented by means of software plus a necessary general hardware platform, or certainly by means of hardware. In many cases, however, the former is a better implementation manner. Based on such an understanding, the technical solution of the present disclosure in essence or that part contributing to the current technologies can be embodied in the form of a software product, and the computer software product is stored in a storage medium (such as a ROM/RAM, a magnetic disk, or an optical disc) which includes a number of instructions to enable a terminal device (which may be a mobile phone, a computer, a server, a network device, etc.) to execute the method of each embodiment of the present disclosure.

Figure 4:
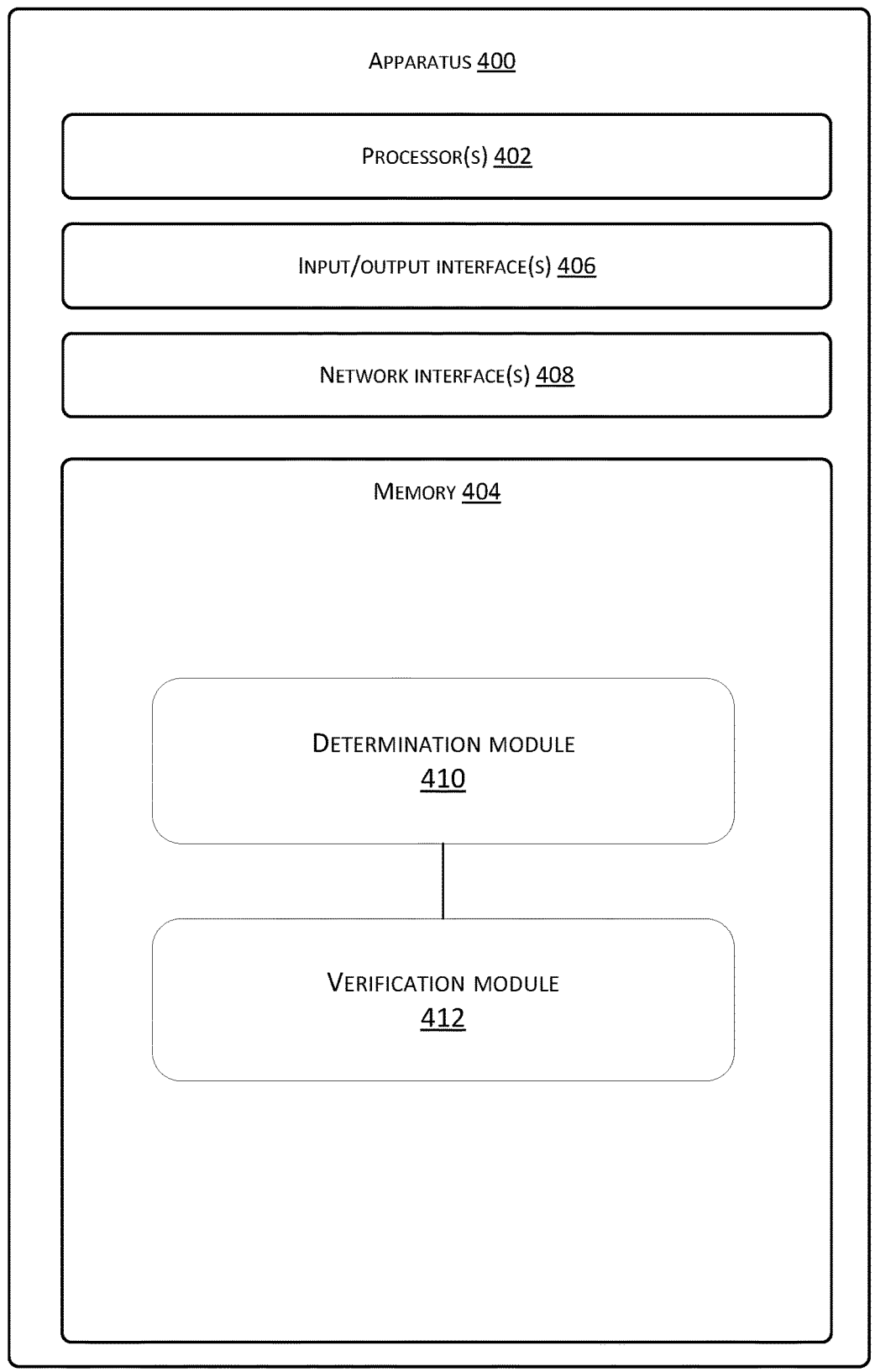
FIG. 4 shows a structural block diagram of a data verification apparatus provided according to an example embodiment of the present disclosure.

According to an embodiment of the present disclosure, an apparatus for implementing the aforementioned data verification method is further provided, which is as shown in FIG. 4. FIG. 4 shows a structural block diagram of a data verification apparatus 400 provided according to an embodiment of the present disclosure.

As shown in FIG. 4, the apparatus 400 includes one or more processor(s) 402 or data processing unit(s) and memory 404. The apparatus 400 may further include one or more input/output interface(s) 406 and one or more network interface(s) 408.

The memory 404 is an example of computer readable media. The computer readable media include non-volatile and volatile media as well as movable and non-movable media, and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media (transitory media) such as a modulated data signal and carrier.

The memory 404 may store therein a plurality of modules or units including a determination module 410 and a verification module 412.

The determination module 410 is configured to determine a to-be-verified data block among a plurality of data blocks corresponding to a predetermined file in a distributed storage system, wherein a storage node where the to-be-verified data block is located comprises: a storage node that meets a load balancing strategy in the distributed storage system.

It should be noted that the aforementioned load balancing strategy can be used to balance verification tasks on storage nodes storing data blocks in a distributed storage system. For example, if there are many verification tasks on a certain storage node (the number of verification tasks reaches a threshold) or the verification tasks are complex (the complexity of the verification tasks is greater than a threshold), the storage node can be considered as over-loaded. When a data block needs to be verified, if it is found that it should correspond to the storage node, the data block is not verified at this time. However, when there are only a few verification tasks on the storage node corresponding to the data block or the verification tasks are simple, the data block can then be verified. In this way, the verification tasks on the storage nodes in the distributed storage system can be balanced, such that some storage nodes would not have excessive load.

It should be noted that the storage node that meets a load balancing strategy in the aforementioned distributed storage system can be considered, among a plurality of storage nodes in the distributed storage system, as a storage node with fewer (the number of verification tasks is less than a threshold) or simpler (the complexity of verification tasks is less than a threshold) verification tasks, but it is not so limited.

For the sake of data security, a data block can be replicated and a plurality of replicas can be made. Each replica is respectively stored on a different storage node, i.e., each replica corresponding to a storage node. Therefore, in an example embodiment of the present application, the aforementioned determination module 410 is further used to select a first data block from a plurality of data blocks as a to-be-verified data block, wherein the first data block is a data block stored in storage nodes, where the replicas are located, among which a number of first storage nodes reaches a predetermined number, and the first storage nodes are storage nodes on which the number of verification tasks has not reached the upper limit of verification tasks. That is, among the storage nodes where the replicas of the determined to-be-verified data block are located, the number of storage nodes with fewer verification tasks reaches the predetermined number.

It should be noted that the aforementioned predetermined number may be preset according to needs. In an example embodiment of the present disclosure, the aforementioned predetermined number may be the number of all replicas of a data block. That is, it can be considered that there are fewer verification tasks on the storage nodes where all replicas of the aforementioned to-be-verified data block are located.

In an example embodiment of the present application, the aforementioned determination module 410 can select a first data block from a plurality of data blocks as the to-be-verified data block according to a first mapping table, wherein the first mapping table stores a corresponding relationship between the address of a storage node and the number of concurrent verification tasks that access the storage node.

The verification module 412 is connected to the aforementioned determination module 410 and is configured to verify the to-be-verified data block.

In the solution disclosed in the aforementioned apparatus embodiment of the present application, after the determination module 410 determines a to-be-verified data block among a plurality of data blocks included in a predetermined file in a distributed storage system, the verification module 412 verifies the to-be-verified data block. The storage node where the determined to-be-verified data block is located is a storage node that meets a load balancing strategy in the distributed storage system. The solution can achieve the determination of the to-be-verified data block based on the load balancing strategy.

It is easy to notice that the storage node where the to-be-verified data block is located is a storage node that meets a load balancing strategy in the distributed storage system, i.e., the storage node being one on which the determined to-be-verified data block is located meets a load balancing strategy in the distributed storage system, which also means that the aforementioned determined to-be-verified data block is in fact determined based on a load balancing strategy. Therefore, through the aforementioned solution provided in the embodiment of the present application, during the process of verifying the to-be-verified data block, the problem that a large number of verification requests are centralized on several storage nodes which causes excessive load on some storage nodes can be avoided, effectively reducing contention among different verification tasks, greatly improving the overall verification speed of the cluster in the distributed storage system, achieving the purpose of decreasing occupation of disk and network resources of storage nodes, and reducing the impact on the read/write operations at a user front end during the data verification process, thereby achieving the technical effect of improved read/write performance, and solving the technical problem in the conventional technologies in which the read/write performance of a user front end is affected during a data verification process.

In order to reduce transmission traffic, in an example embodiment of the present disclosure, the verification module 412 comprises: a processing unit, configured to perform secondary slicing on the to-be-verified data block to obtain data block slices; and a verification unit, connected to the aforementioned processing unit and configured to verify the data block slices.

It should be noted that in order to ensure that the additional resource overhead caused by data verification on storage nodes can be controlled within an acceptable range, the present application provides an example embodiment. That is, the aforementioned verification unit is further used to determine whether the number of verification requests on storage nodes where the data block slices are located has not reached the upper limit of verification requests; and if the determination result is that the number of verification requests on storage nodes where the data block slices are located has not reached the upper limit of verification requests, verify the data block slices. That is, by controlling the number of verification requests on storage nodes where the data block slices are located within a certain range, it can be ensured that the additional resource overhead caused by data verification on storage nodes can be controlled within an acceptable range, further achieving the purpose of decreasing occupation of disk and network resources of storage nodes, and reducing the impact on the read/write operations at a user front end during the data verification process, thereby achieving the technical effect of improved read/write performance, and better solving the technical problem in the conventional technologies in which the read/write performance of a user front end is affected during a data verification process.

It should be noted that the upper limit of verification requests may be the maximum number of verification requests allowed to be transmitted to storage nodes per unit time, but it is not so limited. The aforementioned upper limit of verification requests may be preset based on the characteristics of storage nodes, or may be set according to experience, but it is not so limited.

In order to better decrease occupation of disk and network resources of storage nodes, it can be further ensured that the number of verification requests on storage nodes per unit time can be controlled within a certain range, thereby ensuring that the number of verification requests on storage nodes per unit time can be controlled within an acceptable range. In an example embodiment of the present disclosure, the number of verification requests on storage nodes where the aforementioned data block slices are located is reset to zero within a predetermined period of time.

It should be noted that the "unit" in the aforementioned unit time can be any time, such as 1 s, 3 s, 5 s, 50 ms, etc., but it is not so limited. For example, the aforementioned predetermined period of time can be considered as unit time, which is not limited thereby.

In an example embodiment of the present disclosure, the aforementioned verification unit can, based on a second mapping table, determine whether the number of verification requests on storage nodes where the data block slices are located has not reached the upper limit of verification requests, wherein the second mapping table stores a corresponding relationship between the address of a storage node and the number of verification requests that access the storage node.

It should be noted that the address of the storage node can be used as a "key" value in the second mapping table, and the number of verification requests that access the storage node can be used as a "value" value corresponding to the "key" value in the second mapping table, which is not limited thereby.

It should be noted that after verification of the aforementioned data block slices, the situation where check codes are inconsistent may appear. At this time, there is a high probability that the user is modifying the interval corresponding to the data block slices, and the data is changing dynamically. Therefore, in the aforementioned embodiment of the present application, after verification of the aforementioned data block slices, the aforementioned apparatus may further comprise: a retry module, connected to the aforementioned verification unit and configure to perform a verification retry on the data block slices in a back-off retry manner, wherein the back-off retry manner is to perform a delayed retry on the data block slices.

In an example embodiment of the present application, during the process of verification retry, the time interval of a current retry is determined by the time interval of the preceding retry immediately before the current retry, wherein the time interval of the current retry is greater than the time interval of the preceding retry.

By verification retry on the data block slices in the aforementioned back-off retry manner, the present application avoids having too many retry requests that would affect the normal read/write of the interval corresponding to the aforementioned data block slices, and the time of continuously observing the aforementioned data block slices is also increased, further achieving the purpose of decreasing occupation of disk and network resources of storage nodes, and reducing the impact on the read/write operations at a user front end during the data verification process, thereby achieving the technical effect of improved read/write performance, and better solving the technical problem in the conventional technologies in which the read/write performance of a user front end is affected during a data verification process.

It should be noted that the step of the time interval of the current retry being determined by the time interval of the preceding retry immediately before the current retry can be embodied as follows: a predetermined value is obtained from the time interval of the preceding retry through recursive function processing, and the smaller one of the predetermined value and the upper limit of retry interval is the time interval of this retry.

It should be noted here that the aforementioned determination module 410 and the verification module 412 correspond to steps S202 to S204 in the above method embodiment. The examples and application scenarios achieved by the two modules and the corresponding steps are the same, but are not limited to the content disclosed by the aforementioned method embodiment. It should be noted that the aforementioned modules can run as a part of the apparatus in the computer terminal 100 provided in the method embodiment.

An embodiment of the present disclosure provides a computer terminal, and the computer terminal may be any computer terminal device in a computer terminal group. For example, in this embodiment, the aforementioned computer terminal may also be replaced with a terminal device such as a mobile terminal.

For example, in this embodiment, the aforementioned computer terminal may be located in at least one of more network devices in a computer network.

In this embodiment, the aforementioned computer terminal can execute the program code of the following steps in the data verification method of the application program: determine a to-be-verified data block among a plurality of data blocks included in a predetermined file in a distributed storage system, wherein a storage node where the to-be-verified data block is located is a storage node that meets a load balancing strategy in the distributed storage system; and verify the to-be-verified data block.

Figure 5:
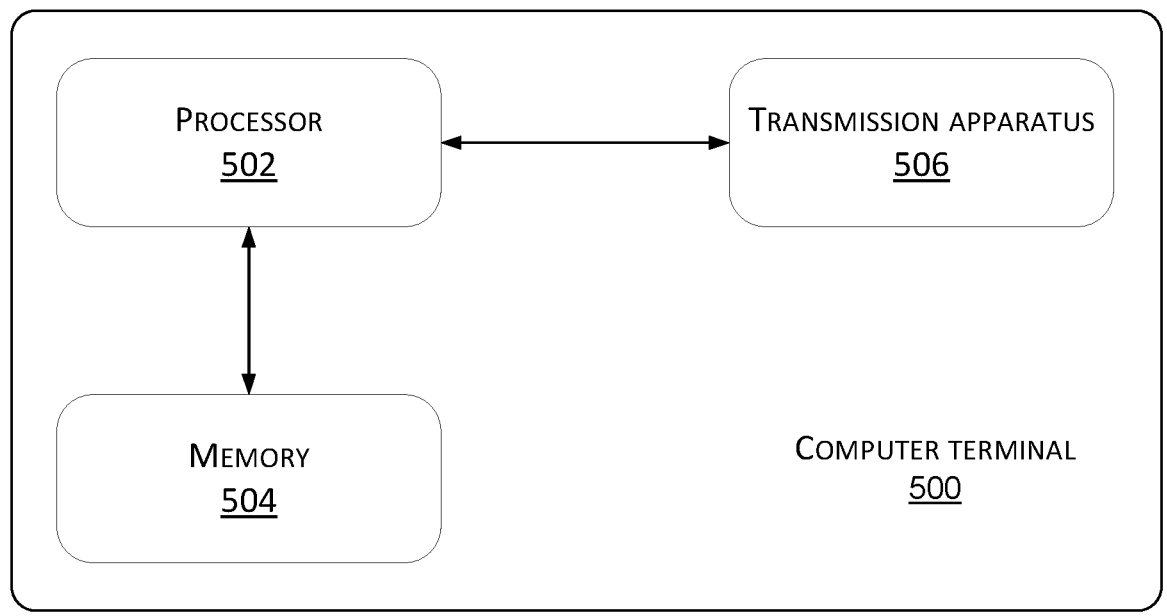
FIG. 5 shows a structural block diagram of a computer terminal according to an example embodiment of the present disclosure.

For example, FIG. 5 shows a structural block diagram of a computer terminal according to an embodiment of the present disclosure. As shown in FIG. 5, the computer terminal 500 may comprise: one or more (only one is shown in the figure) processors 502, a memory 504, and a transmission apparatus 506.

Here, the memory 504 can be used to store software programs and modules, such as program instructions/modules corresponding to the data verification method and apparatus in the embodiments of the present disclosure. The processor 502 runs the software programs and modules stored in the memory 504 to execute various function applications and data processing, i.e., achieving the aforementioned data verification method of application programs. The memory 504 may comprise a high-speed random access memory, and may also comprise a non-volatile memory, such as one or more magnetic storage apparatuses, flash memories, or other non-volatile solid-state memories. In some examples, the memory 504 may further comprise memories remotely disposed with respect to the processor.

These remote memories may be connected to the computer terminal 500 via a network. Examples of the aforementioned network include, but are not limited to, the Internet, corporate intranets, local area networks, mobile communication networks, and combinations thereof.

The processor 502 can call information and application programs stored in the memory through the transmission apparatus to perform the following steps: determine a to-be-verified data block among a plurality of data blocks corresponding to a predetermined file in a distributed storage system, wherein a storage node where the to-be-verified data block is located comprises: a storage node that meets a load balancing strategy in the distributed storage system; and verify the to-be-verified data block.

For example, the aforementioned processor can also execute the program code of the following step: select a first data block from a plurality of data blocks as a to-be-verified data block, wherein the first data block is a data block stored in storage nodes, where the replicas are located, among which a number of first storage nodes reaches a predetermined number, and the first storage nodes are storage nodes on which the number of verification tasks has not reached the upper limit of verification tasks.

For example, the aforementioned processor can also execute the program code of the following step: select a first data block from a plurality of data blocks as the to-be-verified data block according to a first mapping table, wherein the first mapping table stores a corresponding relationship between the address of a storage node and the number of concurrent verification tasks that access the storage node.

For example, the aforementioned processor can also execute the program code of the following steps: perform secondary slicing on the to-be-verified data block to obtain data block slices; and verify the data block slices.

For example, the aforementioned processor can also execute the program code of the following steps: determine whether the number of verification requests on storage nodes where the data block slices are located has not reached the upper limit of verification requests; if the determination result is that the number of verification requests on storage nodes where the data block slices are located has not reached the upper limit of verification requests, verify the data block slices.

For example, the aforementioned processor can also execute the program code of the following step: according to a second mapping table, determine whether the number of verification requests on storage nodes where the data block slices are located has not reached the upper limit of verification requests, wherein the second mapping table stores a corresponding relationship between the address of a storage node and the number of verification requests that access the storage node.

For example, the aforementioned processor can also execute the program code of the following step: after verification of the data block slices, perform a verification retry on the data block slices in a back-off retry manner, wherein the back-off retry manner is to perform a delayed retry on the data block slices.

In the solution disclosed in the aforementioned embodiment of the present application, after determining a to-be-verified data block among a plurality of data blocks included in a predetermined file in a distributed storage system, the to-be-verified data block is verified. The storage node where the determined to-be-verified data block is located is a storage node that meets a load balancing strategy in the distributed storage system; and the solution can achieve the determination of the to-be-verified data block based on a load balancing strategy.

It is easy to notice that the storage node where the to-be-verified data block is located is a storage node that meets a load balancing strategy in the distributed storage system, i.e., the storage node being one on which the determined to-be-verified data block is located meets a load balancing strategy in the distributed storage system, which also means that the aforementioned determined to-be-verified data block is in fact determined based on a load balancing strategy. Therefore, through the aforementioned solution provided in the embodiment of the present application, during the process of verifying the to-be-verified data block, the problem that a large number of verification requests are centralized on several storage nodes which causes excessive load on some storage nodes can be avoided, effectively reducing contention among different verification tasks, greatly improving the overall verification speed of the cluster in the distributed storage system, achieving the purpose of decreasing occupation of disk and network resources of storage nodes, and reducing the impact on the read/write operations at a user front end during the data verification process, thereby achieving the technical effect of improved read/write performance, and solving the technical problem in the conventional technologies in which the read/write performance of a user front end is affected during a data verification process.

A person of ordinary skill in the art can appreciate that the structure shown in FIG. 5 is only for illustration, and the computer terminal can also be a smart phone (such as Android phones, iOS phones, etc.), tablet computers, hand-held computers, and mobile Internet devices (Mobile Internet Devices, MID), PAD, and other terminal equipment. The structures of the above electronic device is not limited by FIG. 5. For example, the computer terminal 500 may further include more or fewer components (such as a network interface, a display device, etc.) than those shown in FIG. 5, or have a configuration different from that shown in FIG. 5.

Those of ordinary skill in the art can appreciate that all or part of the steps in the various methods of the aforementioned embodiments can be completed by instructing the relevant hardware of the terminal device through a program. The program can be stored in a computer_readable medium, which may include: a flash disk, read-only memory (Read-Only Memory, ROM), random access memory (Random Access Memory, RAM), a magnetic disk or optical disk, etc.

The embodiment of the present disclosure further provides a storage medium. For example, in this embodiment, the aforementioned storage medium may be used to store the program code executed by the data verification method provided in the aforementioned Embodiment 1.

For example, in this embodiment, the aforementioned storage medium may be located in any computer terminal of a computer terminal group in a computer network, or in any mobile terminal of a mobile terminal group.

For example, in this embodiment, the storage medium is configured to store the program code for executing the following steps: determine a to-be-verified data block among a plurality of data blocks corresponding to a predetermined file in a distributed storage system, wherein a storage node where the to-be-verified data block is located comprises: a storage node that meets a load balancing strategy in the distributed storage system; and verify the to-be-verified data block.

For example, the aforementioned storage medium is further configured to store the program code for performing the following step: select a first data block from a plurality of data blocks as a to-be-verified data block, wherein the first data block is a data block stored in storage nodes, where the replicas are located, among which a number of first storage nodes reaches a predetermined number, and the first storage nodes are storage nodes on which the number of verification tasks has not reached the upper limit of verification tasks.

For example, the aforementioned storage medium is further configured to store the program code for executing the following step: select a first data block from a plurality of data blocks as the to-be-verified data block according to a first mapping table, wherein the first mapping table stores a corresponding relationship between the address of a storage node and the number of concurrent verification tasks that access the storage node.

For example, the aforementioned storage medium is further configured to store the program code for executing the following steps: perform secondary slicing on the to-be-verified data block to obtain data block slices; and verify the data block slices.

For example, the aforementioned storage medium is further configured to store the program code for executing the following steps: determine whether the number of verification requests on storage nodes where the data block slices are located has not reached the upper limit of verification requests; if the determination result is that the number of verification requests on storage nodes where the data block slices are located has not reached the upper limit of verification requests, verify the data block slices.

For example, the aforementioned storage medium is further configured to store the program code for executing the following step: according to a second mapping table, determine whether the number of verification requests on storage nodes where the data block slices are located has not reached the upper limit of verification requests, wherein the second mapping table stores a corresponding relationship between the address of a storage node and the number of verification requests that access the storage node.

For example, the aforementioned storage medium is further configured to store the program code for executing the following step: after verification of the data block slices, perform a verification retry on the data block slices in a back-off retry manner, wherein the back-off retry manner is to perform a delayed retry on the data block slices.

Embodiment 5

This embodiment provides a processor, and the processor is used to run a program, which when running, executes the program code executed by the data verification method provided in the aforementioned Embodiment 1.

For example, in this embodiment, the aforementioned processor may be located in any computer terminal of a computer terminal group in a computer network, or in any mobile terminal of a mobile terminal group.

For example, in this embodiment, the processor is configured to execute the program code of the following steps: determine a to-be-verified data block among a plurality of data blocks corresponding to a predetermined file in a distributed storage system, wherein a storage node where the to-be-verified data block is located comprises: a storage node that meets a load balancing strategy in the distributed storage system; and verify the to-be-verified data block.

For example, in this embodiment, the processor is configured to execute the program code of the following step: select a first data block from a plurality of data blocks as a to-be-verified data block, wherein the first data block is a data block stored in storage nodes, where the replicas are located, among which a number of first storage nodes reaches a predetermined number, and the first storage nodes are storage nodes on which the number of verification tasks has not reached the upper limit of verification tasks.

For example, in this embodiment, the processor is configured to execute the program code of the following step: select a first data block from a plurality of data blocks as the to-be-verified data block according to a first mapping table, wherein the first mapping table stores a corresponding relationship between the address of a storage node and the number of concurrent verification tasks that access the storage node.

For example, in this embodiment, the processor is configured to execute the program code of the following steps: perform secondary slicing on the to-be-verified data block to obtain data block slices; and verify the data block slices.

For example, in this embodiment, the processor is configured to execute the program code of the following steps: determine whether the number of verification requests on storage nodes where the data block slices are located has not reached the upper limit of verification requests; if the determination result is that the number of verification requests on storage nodes where the data block slices are located has not reached the upper limit of verification requests, verify the data block slices.

For example, in this embodiment, the processor is configured to execute the program code of the following step: according to a second mapping table, determine whether the number of verification requests on storage nodes where the data block slices are located has not reached the upper limit of verification requests, wherein the second mapping table stores a corresponding relationship between the address of a storage node and the number of verification requests that access the storage node.

For example, in this embodiment, the processor is configured to execute the program code of the following step: after verification of the data block slices, perform a verification retry on the data block slices in a back-off retry manner, wherein the back-off retry manner is to perform a delayed retry on the data block slices.

It should be noted that for a concise description, the aforementioned method embodiments are all expressed as a series of action combinations. However, those skilled in the art should know that the present application is not limited by the described sequence of actions as some steps can be performed in alternate orders or in parallel according to the present application. Secondly, those skilled in the art should also know that the embodiments described in the specification are all preferred embodiments, and the involved actions and modules are not necessarily required by the present application.

The serial numbers of the embodiments of the present disclosure are merely for description, and do not represent an order of quality of the embodiments.

In the aforementioned embodiments of the present disclosure, the description of each embodiment has its own emphasis. For any part that is not described in detail in an embodiment, reference may be made to related descriptions in other embodiments.

In the several embodiments provided in the present application, it should be appreciated that the disclosed technical content can be implemented in other manners. Here, the apparatus embodiments described above are merely illustrative. For example, the division of the units is only a logical function division. In actual implementation, there may be other division manners. For example, a plurality of units or components may be combined or may be integrated into another system, or some features can be ignored or not implemented. In addition, the displayed or discussed mutual coupling, direct coupling, or communication connection may be achieved through some interfaces, and indirect coupling or communication connection of units or modules may be in electrical or other forms.

The units described as separate components may or may not be physically separated, and the components displayed as units may or may not be physical units. That is, they may be located in one place, or they may be distributed on a plurality of network units. Some or all of the units may be selected according to actual needs to achieve the objectives of the solutions of the embodiments.

In addition, the functional units in the various embodiments of the present disclosure may be integrated into one processing unit, or each unit may be present individually and physically, or two or more units may be integrated into one unit. The aforementioned integrated units may be implemented in the form of hardware or software function units.

If the integrated units are implemented in the form of software function units and sold or used as independent products, they may be stored in a computer readable storage medium. Based on such an understanding, the technical solution of the present disclosure in essence or the part contributing to the current technologies or the technical solution in whole or in part can be embodied in the form of a software product; and the computer software product is stored in a storage medium which includes a number of instructions to enable a computer device (which can be a personal computer, a server, a network device, etc.) to execute all or part of the steps of the method described in each embodiment of the present disclosure. The aforementioned storage medium includes USB flash disks, read-only memories (ROMs), random access memories (RAMs), mobile hard disks, magnetic disks, optical disks, or other media that may store program code.

The aforementioned embodiments are merely preferred embodiments of the present disclosure. It should be noted that for those skilled in the art, several improvements and modifications may be made without departing from the principles of the present disclosure. These improvements and modifications should also be deemed as falling within the protection scope of the present disclosure.

The present disclosure may further be understood with clauses as follows.

Clause 1. A data verification method comprising:
determining a to-be-verified data block among a plurality of data blocks corresponding to a predetermined file in a distributed storage system, a storage node where the to-be-verified data block is located including a storage node that meets a load balancing strategy in the distributed storage system; and
verifying the to-be-verified data block.

Clause 2. The method according to clause 1, wherein the determining the to-be-verified data block among the plurality of data blocks corresponding to the predetermined file in the distributed storage system comprises:
selecting a first data block from the plurality of data blocks as the to-be-verified data block,
wherein:
the first data block is a data block stored in storage nodes, where replicas of the data block are located, among which a number of first storage nodes reaches a predetermined number; and the first storage nodes are storage nodes on which the number of verification tasks has not reached the upper limit of verification tasks.

Clause 3. The method according to clause 2, wherein the predetermined number is a number of all replicas of the data block.

Clause 4. The method according to clause 2 or 3, further comprising selecting the first data block from the plurality of data blocks as the to-be-verified data block according to a first mapping table, wherein the first mapping table stores a corresponding relationship between an address of a storage node and a number of concurrent verification tasks that access the storage node.

Clause 5. The method according to clause 1, wherein the verifying the to-be-verified data block comprises:

performing a secondary slicing on the to-be-verified data block to obtain a data block slice; and verifying the data block slice.

Clause 6. The method according to clause 5, wherein the verifying the data block slice comprises:

determining whether a number of verification requests on the storage node where the data block slice is located has not reached an upper limit of verification requests; and in response to determining that the number of verification requests on the storage node where the data block slice is located has not reached the upper limit of verification requests, verifying the data block slice.

Clause 7. The method according to clause 6, wherein the number of verification requests on the storage node where the data block slice is located is reset to zero within a predetermined period of time.

Clause 8. The method according to clause 6 or 7, further comprising:

determining whether the number of verification requests on the storage node where the data block slice is located has not reached the upper limit of verification requests according to a second mapping table, wherein the second mapping table stores a corresponding relationship between an address of a storage node and a number of verification requests that access the storage node.

Clause 9. The method according to clause 5, wherein after the verifying the data block slice, the method further comprises:

performing a verification retry on the data block slices in a back-off retry, wherein the back-off retry including performing a delayed retry on the data block slice.

Clause 10. The method according to clause 9, wherein the performing a verification retry on the data block slices in a back-off retry comprises:

during a process of verification retry, determining a time interval of a current retry by a time interval of a preceding retry immediately before the current retry, wherein the time interval of the current retry is greater than the time interval of the preceding retry.

Clause 11. A data verification apparatus comprising:

a determination module, configured to determine a to-be-verified data block among a plurality of data blocks corresponding to a predetermined file in a distributed storage system, wherein a storage node where the to-be-verified data block is located includes a storage node that meets a load balancing strategy in the distributed storage system; and a verification module, configured to verify the to-be-verified data block.

Clause 12. The apparatus according to clause 11, wherein the determination module is configured to select a first data block from the plurality of data blocks as the to-be-verified data block, wherein:

the first data block is a data block stored in storage nodes, where replicas of the data block are located, among which a number of first storage nodes reaches a predetermined number; and the first storage nodes are storage nodes on which a number of verification tasks has not reached an upper limit of verification tasks.

Clause 13. A storage medium, wherein the storage medium stores therein a program instruction, wherein the program instruction, when running, controls a device where the storage medium is located to execute the data verification method according to any one of clauses 1 to 10.

What is claimed is:

1. A method comprising:

determining a to-be-verified data block among a plurality of data blocks corresponding to a predetermined file in a distributed storage system, the to-be-verified data block being stored in a storage node that meets a load balancing strategy in the distributed storage system, the determining the to-be-verified data block among the plurality of data blocks corresponding to the predetermined file in the distributed storage system including selecting a first data block from the plurality of data blocks as the to-be-verified data block, the first data block being a data block stored in storage nodes, where replicas of the data block are located, among which a number of first storage nodes reaches a predetermined number; and verifying the to-be-verified data block.

2. The method according to claim 1, wherein the first storage nodes are storage nodes on which a number of verification tasks has not reached an upper limit of verification tasks.

3. The method according to claim 1, wherein the predetermined number is a number of all replicas of the data block.

4. The method according to claim 1, wherein the selecting the first data block from the plurality of data blocks as the to-be-verified data block comprises:

selecting the first data block from the plurality of data blocks as the to-be-verified data block according to a first mapping table.

5. The method according to claim 4, wherein the first mapping table stores a corresponding relationship between an address of the storage node and a number of concurrent verification tasks that access the storage node.

6. The method according to claim 1, wherein the verifying the to-be-verified data block comprises:

performing a secondary slicing on the to-be-verified data block to obtain a data block slice; and verifying the data block slice.

7. The method according to claim 6, wherein the verifying the data block slice comprises:

determining that a number of verification requests on the storage node where the data block slice is located has not reached an upper limit of verification requests; and verifying the data block slice.

8. The method according to claim 7, wherein the number of verification requests on the storage node where the data block slice is located is reset to zero within a predetermined period of time.

9. The method according to claim 7, wherein the determining that the number of verification requests on the storage node where the data block slice is located has not reached the upper limit of verification requests comprises:

determining that the number of verification requests on the storage node where the data block slice is located has not reached the upper limit of verification requests according to a second mapping table.

10. The method according to claim 9, wherein the second mapping table stores a corresponding relationship between an address of the storage node and the number of verification requests that access the storage node.

11. The method according to claim 6, wherein after the verifying the data block slice, the method further comprises:
performing a verification retry on the data block slice in a back-off retry, wherein the back-off retry including performing a delayed retry on the data block slice.

12. The method according to claim 11, wherein the performing the verification retry on the data block slices in the back-off retry comprises:
during a process of verification retry, determining a time interval of a current retry by a time interval of a preceding retry immediately before the current retry, wherein the time interval of the current retry is greater than the time interval of the preceding retry.

13. An apparatus comprising:
one or more processors; and
one or more memories storing thereon computer-readable instructions that, when executed by the one or more processors, cause the one or more processors to perform acts comprising:
determining a to-be-verified data block among a plurality of data blocks corresponding to a predetermined file in a distributed storage system, the to-be-verified data block being stored in a storage node that meets a load balancing strategy in the distributed storage system, the determining the to-be-verified data block among the plurality of data blocks corresponding to the predetermined file in the distributed storage system including selecting a first data block from the plurality of data blocks as the to-be-verified data block, the first data block being a data block stored in storage nodes, where replicas of the data block are located, among which a number of first storage nodes reaches a predetermined number, the first storage nodes being storage nodes on which a number of verification tasks has not reached an upper limit of verification tasks; and
verifying the to-be-verified data block.

14. The apparatus according to claim 13, wherein the selecting the first data block from the plurality of data blocks as the to-be-verified data block comprises:
selecting the first data block from the plurality of data blocks as the to-be-verified data block according to a first mapping table, the first mapping table storing a corresponding relationship between an address of the storage node and a number of concurrent verification tasks that access the storage node.

15. The apparatus according to claim 13, wherein the verifying the to-be-verified data block comprises:
performing a secondary slicing on the to-be-verified data block to obtain a data block slice;
determining that a number of verification requests on the storage node where the data block slice is located has not reached an upper limit of verification requests according to a second mapping table, the second mapping table storing a corresponding relationship between an address of the storage node and the number of verification requests that access the storage node; and
verifying the data block slice.

16. The apparatus according to claim 15, wherein after the verifying the data block slice, the acts further comprise:
performing a verification retry on the data block slice in a back-off retry, wherein the back-off retry including performing a delayed retry on the data block slice.

17. One or more memories storing thereon computer-readable instructions that, when executed by one or more processors, cause the one or more processors to perform acts comprising:
determining a to-be-verified data block among a plurality of data blocks corresponding to a predetermined file in a distributed storage system, the to-be-verified data block being stored in a storage node that meets a load balancing strategy in the distributed storage system; and
verifying the to-be-verified data block, the verifying the to-be-verified data block including:
performing a secondary slicing on the to-be-verified data block to obtain a data block slice;
determining that a number of verification requests on the storage node where the data block slice is located has not reached an upper limit of verification requests according to a second mapping table, the second mapping table storing a corresponding relationship between an address of the storage node and the number of verification requests that access the storage node; and
verifying the data block slice.

18. The one or more memories according to claim 17, wherein the determining the to-be-verified data block among the plurality of data blocks corresponding to the predetermined file in the distributed storage system comprises:
selecting a first data block from the plurality of data blocks as the to-be-verified data block, the first data block being a data block stored in storage nodes, where replicas of the data block are located, among which a number of first storage nodes reaches a predetermined number.

19. The one or more memories according to claim 18, wherein the selecting the first data block from the plurality of data blocks as the to-be-verified data block comprises:
selecting the first data block from the plurality of data blocks as the to-be-verified data block according to a first mapping table, the first mapping table storing a corresponding relationship between an address of the storage node and a number of concurrent verification tasks that access the storage node.

20. The one or more memories according to claim 17, wherein after the verifying the data block slice, the acts further comprise:
performing a verification retry on the data block slice in a back-off retry, wherein the back-off retry including performing a delayed retry on the data block slice.

* * * * *